(12) United States Patent
Koberg et al.

(10) Patent No.: US 7,165,492 B2
(45) Date of Patent: Jan. 23, 2007

(54) METHOD AND APPARATUS TO CLAMP AND RELEASE FLEXIBLE PLATES ONTO AN IMAGING CYLINDER

(75) Inventors: Jörg Koberg, Hohenwestedt (DE); Jörg Wolterink, Oelixdorf (DE)

(73) Assignee: Esko-Graphics A/S, Lystrup (DK)

( * ) Notice: Subject to any disclaimer, the term of this patent is extended or adjusted under 35 U.S.C. 154(b) by 0 days.

(21) Appl. No.: 11/331,424

(22) Filed: Jan. 12, 2006

(65) Prior Publication Data

US 2006/0174791 A1    Aug. 10, 2006

Related U.S. Application Data

(60) Provisional application No. 60/651,095, filed on Feb. 7, 2005.

(51) Int. Cl.
 *B41F 27/12* (2006.01)
(52) U.S. Cl. .................... 101/409; 101/415.1; 271/277; 346/138
(58) Field of Classification Search ................ 101/409, 101/410, 415.1, 477, 248; 271/82, 275, 277; 346/132, 134, 138
See application file for complete search history.

(56) References Cited

U.S. PATENT DOCUMENTS

| 116,616 | A | * | 7/1871 | Mauger | ....................... 101/409 |
| 1,495,257 | A | * | 5/1924 | Dudley | ....................... 101/409 |

(Continued)

OTHER PUBLICATIONS

*Asian Flexo Magazine*, Jul./Aug. 2003. Published by Callahan Publishing Pte Ltd. (On behalf of the Asian Flexographic Technical Association), 18 Mohd Sultan Road #03-01, Singapore. Downloaded Jan. 18, 2005 from: http://ww.afta.com.sg/flexo.htm.

(Continued)

*Primary Examiner*—Leslie J. Evanisko
(74) *Attorney, Agent, or Firm*—Dov Rosenfeld; Inventek

(57) ABSTRACT

A clamping device, a cylinder including a clamping device, and a method for clamping a plate onto the outer surface of the cylinder. The clamping device includes a base body extending in the axial direction and fixed to, or incorporated into the cylinder. The clamping device also includes a clamping element extending in the axial direction. The clamping device also includes a lifting bar located in the interior of the base body and coupled to the clamping element by at least one guiding shaft. The lifting bar being movable in a first radial direction to move the clamping element away from the outer surface of the cylinder to form a gap between the outer surface and the clamping element. The lifting bar also is movable in the radial direction opposite the first radial direction to close the gap formed between the outer surface of the cylinder and the clamping element. The clamping device also includes a mechanism to impart and maintain compressive force between the clamping element and the outer surface of the cylinder such that any gap formed is maintained closed unless forcibly opened. The apparatus is arranged such that when the gap is formed by moving the lifting bar in the first radial direction, the edge of a flexible plate can be placed in the gap, and such that when the gap is closed, the plate is maintained clamped onto the outer edge of the cylinder.

15 Claims, 7 Drawing Sheets

U.S. PATENT DOCUMENTS

| | | | | |
|---|---|---|---|---|
| 2,622,000 | A * | 12/1952 | Thompson | 346/138 |
| 2,674,943 | A * | 4/1954 | Freeman | 101/269 |
| 5,218,379 | A * | 6/1993 | Schmitt et al. | 346/138 |
| 5,335,046 | A * | 8/1994 | Bosy | 355/73 |
| 5,709,150 | A * | 1/1998 | Durr et al. | 101/415.1 |
| 6,561,094 | B1 | 5/2003 | Schneider et al. | 101/415.1 |
| 6,598,530 | B1 | 7/2003 | Schneider et al. | 101/486 |
| 6,705,226 | B1 * | 3/2004 | McManus | 101/409 |
| 2004/0113351 | A1 | 6/2004 | Bouchal et al. | 271/106 |
| 2004/0114191 | A1 | 6/2004 | Salvestro | 358/3.29 |
| 2004/0187721 | A1 | 9/2004 | Salvestro | 101/463.1 |
| 2005/0241514 | A1 * | 11/2005 | Behrens et al. | 101/463.1 |

OTHER PUBLICATIONS

"Cyrel Digital Imager CtP Flexo System," an Esko-Graphics White Paper, Jul. 2004. Esko-Graphics, Gent, Belgium. Downloaded Jan. 18, 2005 from: http://www.esko.com/.

"Technical Specifications—CDI Family." Esko-Graphics, Gent, Belgium. Downloaded Jan. 18, 2005 from: http://www.esko.com/.

"Solutions for Packaging: Flexographic Prepress." CREO Inc. of Burnaby, BC, Canada. Downloaded Jan. 18, 2005 from: http://www.creo.com/.

"Worklow and Proofing Products for Package Printing and Converting." CREO Inc. of Burnaby, BC, Canada. Downloaded Jan. 18, 2005 from: http://www.creo.com/.

* cited by examiner

METHOD AND APPARATUS TO CLAMP AND RELEASE FLEXIBLE PLATES ONTO AN IMAGING CYLINDER

RELATED PATENT APPLICATIONS

The present invention is claims benefit of U.S. Provisional Patent Application Ser. No. 60/651,095, filed Feb. 7, 2005, and titled METHOD AND APPARATUS TO CLAMP AND RELEASE FLEXIBLE PLATES ONTO AN IMAGING CYLINDER.

BACKGROUND

The present invention is related to the field of printing, and in particular, to a method and an apparatus for clamping flexible plates of different thickness and format onto an imaging cylinder, e.g., for exposure in a computer-to-plate imaging device by light energy according to imaging data.

Flexographic plates are frequently exposed from computer data using computer-to-plate (CTP, C2P) imaging. Mounting such plates on a cylinder, e.g., the cylinder or drum of an external drum imaging device is recognized as a problem. For example, one method to mount a flexographic plate on a cylinder is to fix the plates with adhesive tape at the edges. More modern methods use a clamping bar, which clamps the top and bottom edge of a full-size flexographic plate onto the cylinder. First adhesive tape method is very time consuming and second method using a clamping bar only works with full format plates. Since flexographic plate material is relatively expensive a modern method to mount partial plates on a full format cylinder are becoming more and more important.

An example of an external drum imaging device for which such a method and apparatus is applicable is the Esko-Graphics Cyrel Digital Imager (CDI) made by Esko-Graphics A/S, Ballerup, Denmark, the assignee of the present invention.

There is a need in the art for an economical easy-to-use method and apparatus to mount plates of different thickness and format directly onto the imaging cylinder.

In this description and in the claims, by a full-format plate is meant a plate that covers the whole imaging area of the cylinder. By a partial-format plate is meant a plate that covers part of the overall imaging area, such that several partial-format plates (also called plate segments) may be combined to cover the whole imaging area.

One prior art method is for a machine operator to manually mount a full-format plate or partial-format plates onto a cylinder with adhesive tape. Such a method is used, for example, by external drum imaging machines such as the ThermoFlex™ product line made by CREO Inc. of Burnaby, BC, Canada. However, to mount full-format or partial-format plates with adhesive tape is highly time consuming, the operator first mounts a first edge of the plate on the cylinder, fixes it with adhesive tape, turns the cylinder around so that the plate covers the cylinder, and then tapes all the rest of the edges of the plate.

Another prior art solution is for the machine operator to mount full-format plates—those that fully cover the circumference of a cylinder—with the use of a clamp, which is activated manually. An example of a device for so mounting full-format plates is a device used with an imaging drum, called EasyClamp™, made by Esko-Graphics A/S, Ballerup, Denmark, the assignee of the present invention. If partial-format plates are used, the machine operator first mounts partial-format plates onto the cylinder with the use of adhesive tape. The mounting by use of adhesive tape, as stated above, is time consuming.

Yet another prior art solution is for the machine operator to mount full-format plates—the case of the circumference of the cylinder being fully covered by the plate—using a terminal strip, which is activated manually. For mounting a plate, the terminal strip has to be opened manually, the plate has to be fixed under the terminal strip, the terminal strip has to be closed manually, the cylinder then has to be turned around, the terminal strip has to be opened manually again, the second plate edge has to be positioned under the terminal strip and then the terminal strip has to be closed manually. In all cases with the use of a terminal strip, the activation is done by manually by turning a key. This method is suggested, for example, in the HelioFlex® range of products made by HELL Gravure Systems GmbH of Kiel, Germany.

Note that as is the case with the Esko-Graphics Easy-Clamp™, the terminal strip is only for full-format plates. The machine operator mounts partial-format plates with the use of adhesive tape. The mounting by use of adhesive tape, as stated above, is time consuming.

There thus is a need in the art for a method and apparatus that avoids the manual steps of opening and closing clamping devices or a terminal strip, and for an apparatus therefore.

There further is a need in the art for a imaging cylinder that includes a plurality of clamping devices, positioned in a respective plurality of different axial positions, in a respective plurality of different circumferential positions, and/or in a respective plurality of both different axial and different circumferential positions, in order to avoid having to use adhesive tape to fix a partial-format plate to a imaging cylinder.

Thus both partial and full-format plates can be directly clamped at the end edges by the clamping device.

There also is a need in the art to automatically clamp a flexible plate automatically on a imaging cylinder.

There have been previous attempts at automating plate clamping. For example, U.S. Pat. No. 106,561,094 titled "DEVICE FOR FIXING A FLEXIBLE PLATE ON A IMAGING CYLINDER" and U.S. Pat. No. 106,598,530 titled "METHOD FOR FASTENING A FLEXIBLE PLATE," both assigned to Koenig & Bauer AG, of Würzburg, Germany, describe some such other attempts. These are referred to herein as the Koenig & Bauer methods and mechanisms, as the case might be.

The Koenig & Bauer clamping mechanisms are relatively complicated and more expensive. Therefore there is still a need in the art for new clamping methods, e.g., that are simpler and less expensive than the Koenig & Bauer methods and mechanisms.

The Koenig & Bauer methods are applicable to flexible plates that have bent suspension legs. Typical flexographic plates need to be clamped at the end edges, and such do not typically have bent suspension edges. Therefore there still is a need in the art for clamping both full-format and partial-format flexible plates at the end edges, such plates not having bent suspension edges.

The patents describe the use of automatic loading in imaging cylinders; the present invention related to loading on imaging cylinder for CTP systems.

The Koenig & Bauer methods and apparatuses limit the number of clamps on the peripheral cylinder surface to two. Therefore there still is a need in the art for a clamping method and clamping apparatuses such that the number of clamping devices on a cylinder is not limited to a relatively small number.

There further is a need in the art for integrating a mechanism into an imaging cylinder to clamp and release flexible plates. There further is a need in the art for a clamping mechanism and clamping method that can work for a relatively large number of plate formats and thicknesses.

SUMMARY

An aspect of the present invention is a method for fastening flexible plates onto an imaging cylinder, e.g. for digital flexo plates or rubber, e.g., elastomere plates, or conventional flexo plates. Another aspect of the present invention is an apparatus to fasten such flexible plates onto an imaging cylinder.

In one embodiment, an imaging cylinder includes a clamping device, and the method includes placing end edges of a flexible plate between a clamping element of the clamping device and the outer surface of the cylinder. Springs are used to impart a force on to the placed plate towards the outer surface of the cylinder. An inflatable hose and springs are used to open a space between the clamping element and the outer surface to provide for mounting and unmounting plates.

In one embodiment, opening the clamping device is activated by applying air pressure from a pump or external connection. In such a manner, the operator only has to press a button or a foot panel to open or close the clamping device.

Another aspect of the invention is that by using more clamping devices, placed axially and/or in the circumferential direction, the need for adhesive tape to fix partial format plates onto the cylinder might be avoided. Partial and full-format plates are thus directly clamped at the end edges by the clamping devices.

Described herein are a clamping device embodiment, a imaging cylinder that includes a clamping device, and a method for clamping a plate onto the outer surface of the cylinder. One embodiment of the clamping device includes a base body extending in the axial direction and fixed to, or incorporated into the cylinder. The clamping device also includes a clamping element extending in the axial direction. The clamping device also includes a lifting bar located in the interior of the base body and coupled to the clamping element by at least one guiding shaft. The lifting bar is movable in a first radial direction to move the clamping element away from the outer surface of the cylinder to form a gap between the outer surface and the clamping element. The lifting bar also is movable in the radial direction opposite the first radial direction to close the gap formed between the outer surface of the cylinder and the clamping element. The clamping device also includes a mechanism to impart and maintain force between the clamping element and the outer surface of the cylinder such that any gap formed is maintained closed unless forcibly opened. The apparatus is arranged such that when the gap is formed by moving the lifting bar in the first radial direction, the edge of a flexible plate can be placed in the gap, and such that when the gap is closed, the plate is maintained clamped onto the outer edge of the cylinder.

DETAILED DESCRIPTION

Figure 1A:
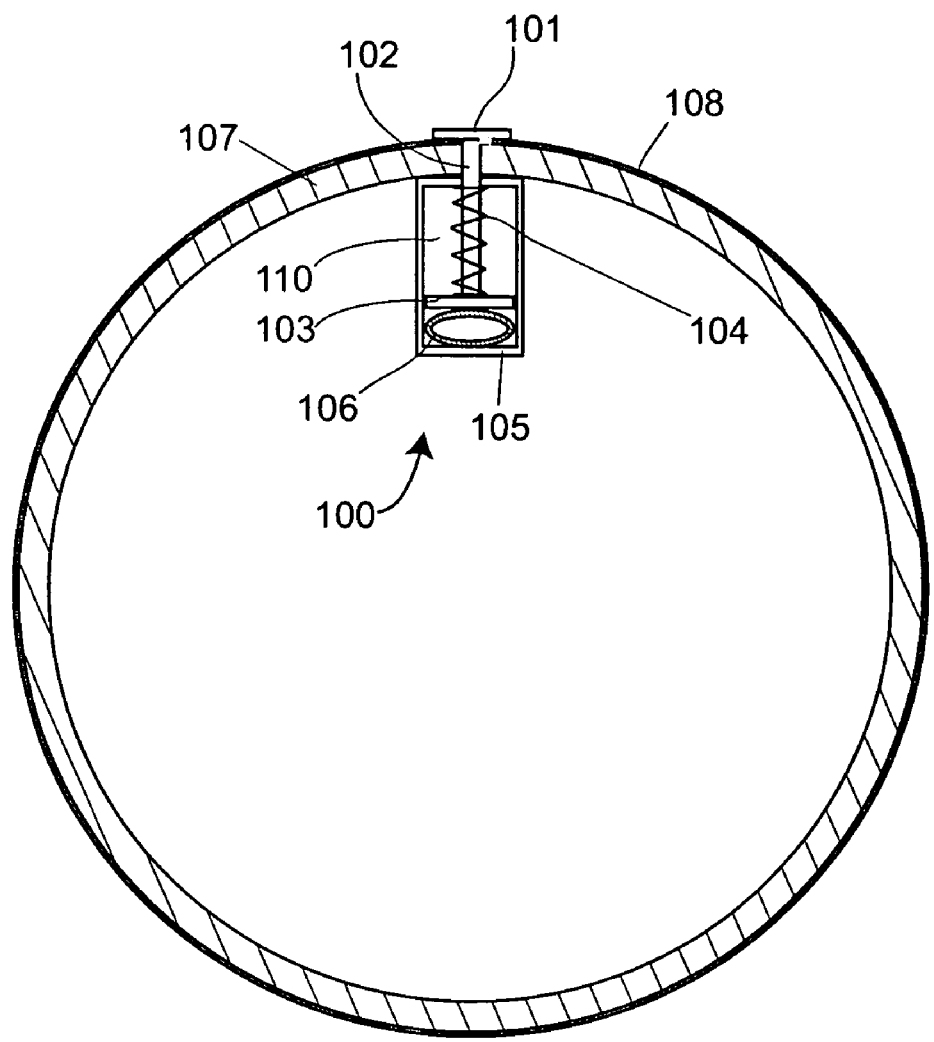
FIG. 1A shows a cross section of a cylinder that includes a clamping device embodiment of the present invention. The cylinder's clamping device is shown in the plate holding ("closed") position, with one plate clamped on the circumference of the cylinder using an embodiment of a clamping device in accordance with an aspect of the present invention.

FIG. 1A shows a cross section of a cylinder 107 that includes a clamping device embodiment 100 of the present invention. The cylinder 107 is, for example, the cylinder of an external drum imaging device for imaging flexographic plates or flexographic plate segments. The cylinder's clamping device 100 is shown in the plate holding ("closed") position, with one plate 108 clamped on the circumference of the cylinder 107.

Figure 1B:
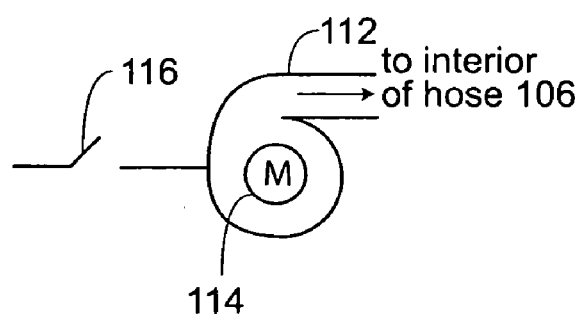
FIG. 1B shows a representation of a of air pressure supply coupled to work with the clamping device embodiment shown in FIG. 1A.
Figure 1C:
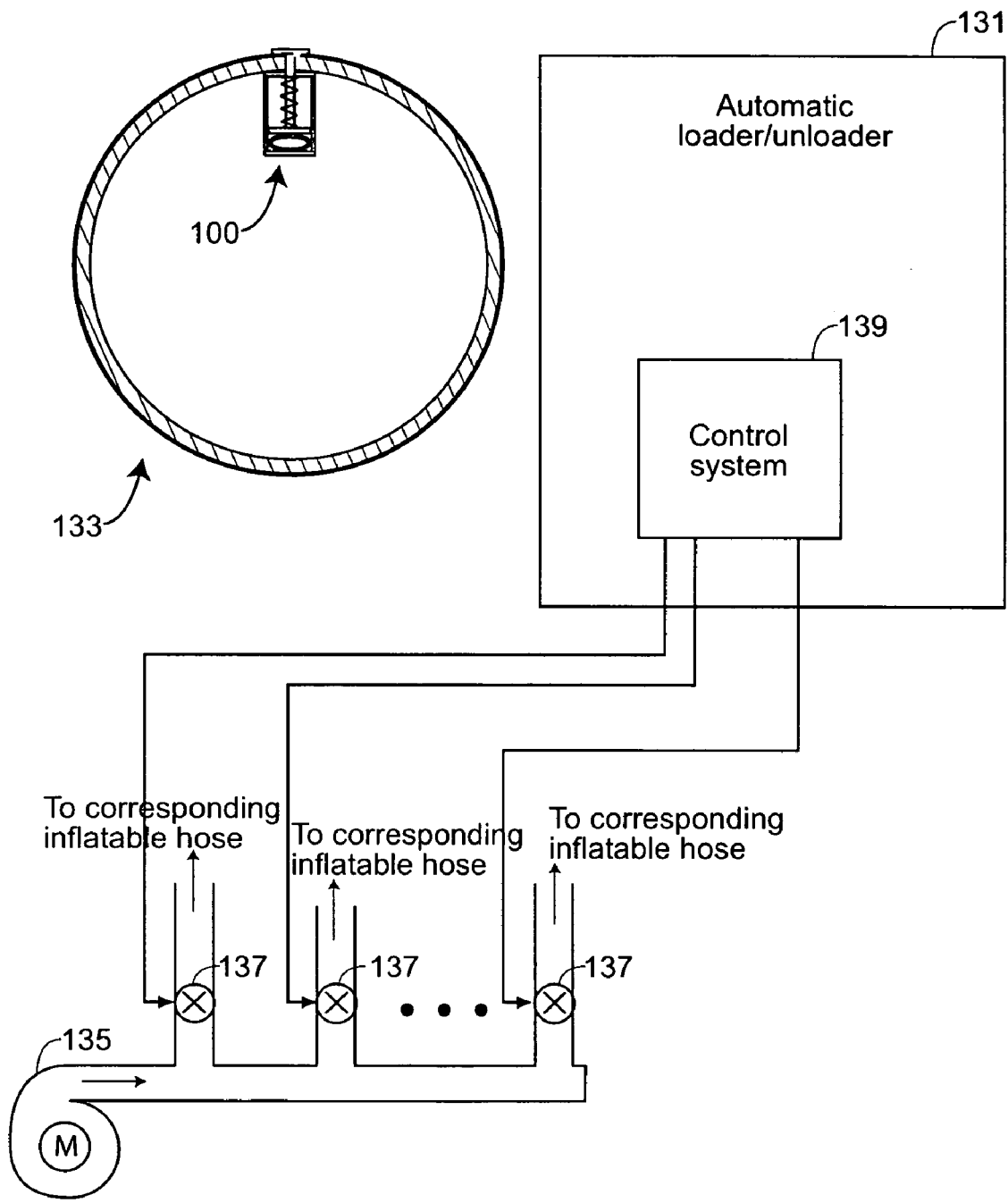
FIG. 1C shows an alternate embodiment that includes a valve element used by an operator or by a control system to automatically switch air pressure on or off while the pump is in operation.
Figure 2:
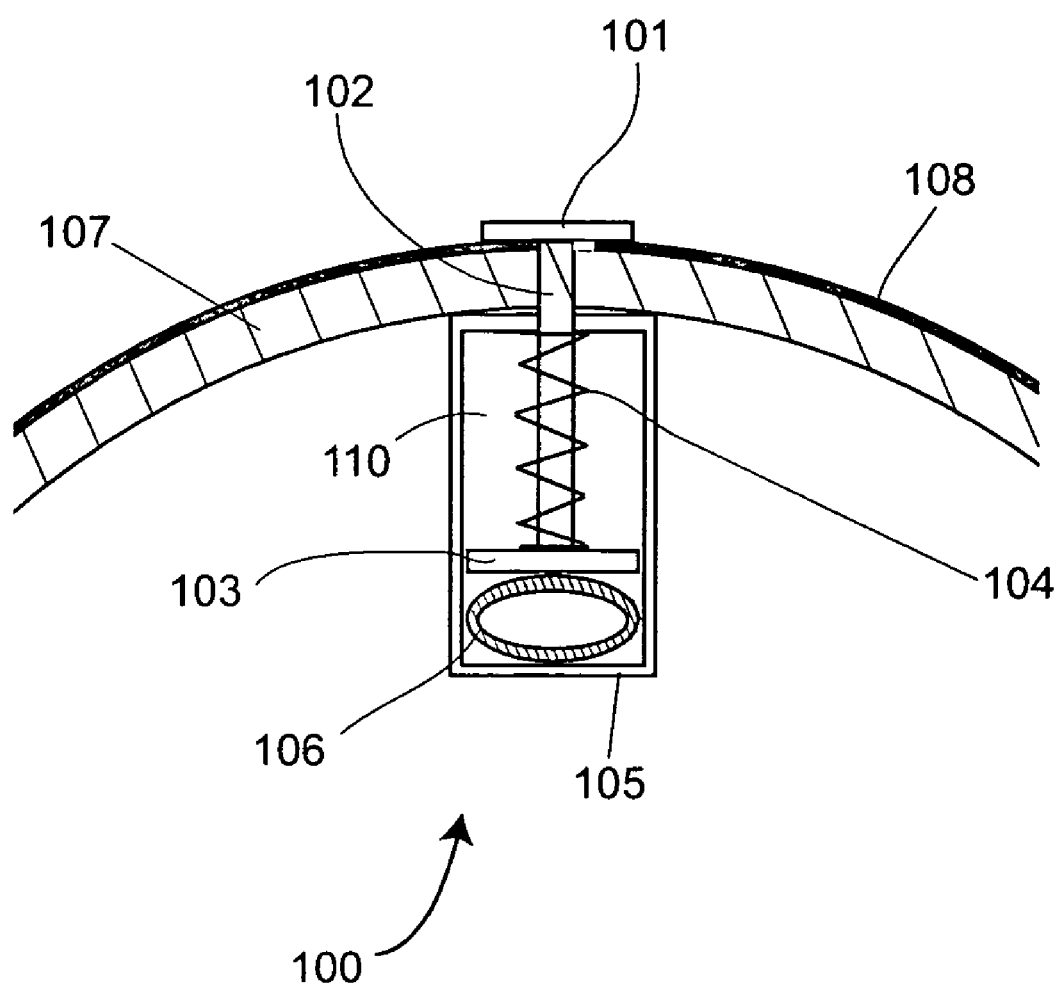
FIG. 2 shows a cross-sectional representation of an embodiment of the clamping device of FIG. 1A in an enlarged scale. The clamping device is shown in the closed position.

FIG. 2 shows a cross-sectional representation of the clamping device 100 of FIG. 1 in an enlarged scale. The state of the clamping device shown is closed.

The clamping device 100 includes a clamping element 101 that has a width and that extends in the axial direction of the cylinder, i.e., in the direction perpendicular to the plane of the drawing. The clamping element 101 and its width are configured to receive a flexible plate in the gap formed between the clamping element and the outer surface of the cylinder, one such plate 108 is shown in FIGS. 1 and 2 located on the circumferential surface of the cylinder 107. The clamping device 100 includes a base body 105 that has a hollow interior 110, which in one embodiment has an approximately rectangular cross-section, and in another, an elliptical or circular cross-section. The base body 105 extends in the axial direction, and in one embodiment is fixed to the inner wall of the cylinder 107, and in another embodiment, is incorporated with the inner wall of the cylinder 107.

A inflatable air hose 106 made of an inflatable material—a rubber compound in one embodiment—is mounted in the hollow interior 110 of the base body 105. The air hose 106 has an inflated state and an uninflated state. A lifting bar 103 is mechanically coupled to the clamping element 101, in one embodiment using at least one guiding shaft 102. At least one spring 104 is positioned between the lifting bar 103 and the base body 105 to exert a force onto the lifting bar 103 to compress the inflatable air hose 106 when the hose 106 is not inflated. In one embodiment, there is one spring per guiding shaft.

FIG. 1B shows a source of air pressure, e.g., a pump 112, that is coupled to the interior of the inflatable air hose 106 and configured to provide air pressure to the interior of the inflatable air hose 106 to inflate the hose 106. In one embodiment, the pump includes a motor 114 and is electrically activated by an electric switch 116 that can be operated, e.g., by the operator pushing a button or activating the pump by a foot panel.

In an alternate embodiment, shown in FIG. 1C, a valve element 137, such as an air pressure switching device, e.g., a magnetic valve is included, and used by an operator or by a control system to automatically switch air pressure on or off while the pump is in operation. In yet another alternate embodiment, an external source of compressed air is used, and a switching device, such as a magnetic valve, is used for switching the air pressure on or off.

While the embodiment described herein is for manual operation under control of an operator, those in the art will easily recognize that the method and apparatus is readily adaptable for automatic operation under control of a control system that automatically switches the air supply on or off, as required, at the correct moments. Such an embodiment is shown in simplified form in FIG. 1C where an automatic loader/unloader 131 is shown with an imaging cylinder 133 of an external drum imager. Other components of the imager are not shown, as would be clear to those in the art. The method and apparatus described herein is readily adaptable to work in conjunction with an automatic loading device such as loader/unloader 131. At least one instance of the clamping device 100 is included on the imaging cylinder 133. Each instance includes a corresponding inflatable hose. A pump 135 is included and is on during operation. The pump is coupled via at least one individual valve device 137 to a corresponding instance of a clamping device. In one embodiment, each valve element is a magnetic valve. While in one embodiment, an operator switches the supply on or off to the corresponding clamping device's inflatable air hose to selectively provide an air supply to any selected clamping device or devices, in the example shown in FIG. 1C, a control system 139 is included to automatically switch the air supply according to the sequence of loading or unloading of the automatic loader/unloader. One example of a control system 139 is a programmable microcontroller programmed to control the sequence of operation of the automatic loader/unloader 130 and of the at least one switching device 137 and corresponding clamping device.

Referring again to FIG. 1B, in an alternate embodiment, a control system of an automatic loader/unloader (not shown in FIG. 1B) is coupled to the switch controlling the pump, such that the air supply is switched on or off automatically according to the loading/unloading sequence.

Therefore, whenever the description herein describes the operator switching on or off the air supply, those in the art will recognize that in an automated system, the operator is readily replaced by a control system, e.g., a programmed microcontroller, to switch the air supply on or off, as required, e.g., by an automatic loading system coupled to or also controlled by the control system, such a controlling system controlling the pump switch in one version, and a pressure switching element such as a magnetic valve in another embodiment.

Continuing with the operator-assisted operation, and referring still to FIG. 1B, to load (or unload) a plate, the operator causes the source 112 of air pressure to provide air pressure to the interior of the inflatable air hose 106 to inflate the hose 106. So inflating the inflatable air hose 106 causes the cross section of the hose to expand. The air hose expanding imparts a force onto the lifting bar 103 that causes the at least one spring 104 to compress the guide shaft and this causes the clamping bar to move such that a gap is created between the clamping element 101 and the outer surface of the cylinder 107. Such a gap provides for inserting or removing the edge of a flexible plate between the clamping element 101 and the outer surface of the cylinder 107. This state of the clamping device 100 is called the open state, and also the release state herein.

Figure 3:
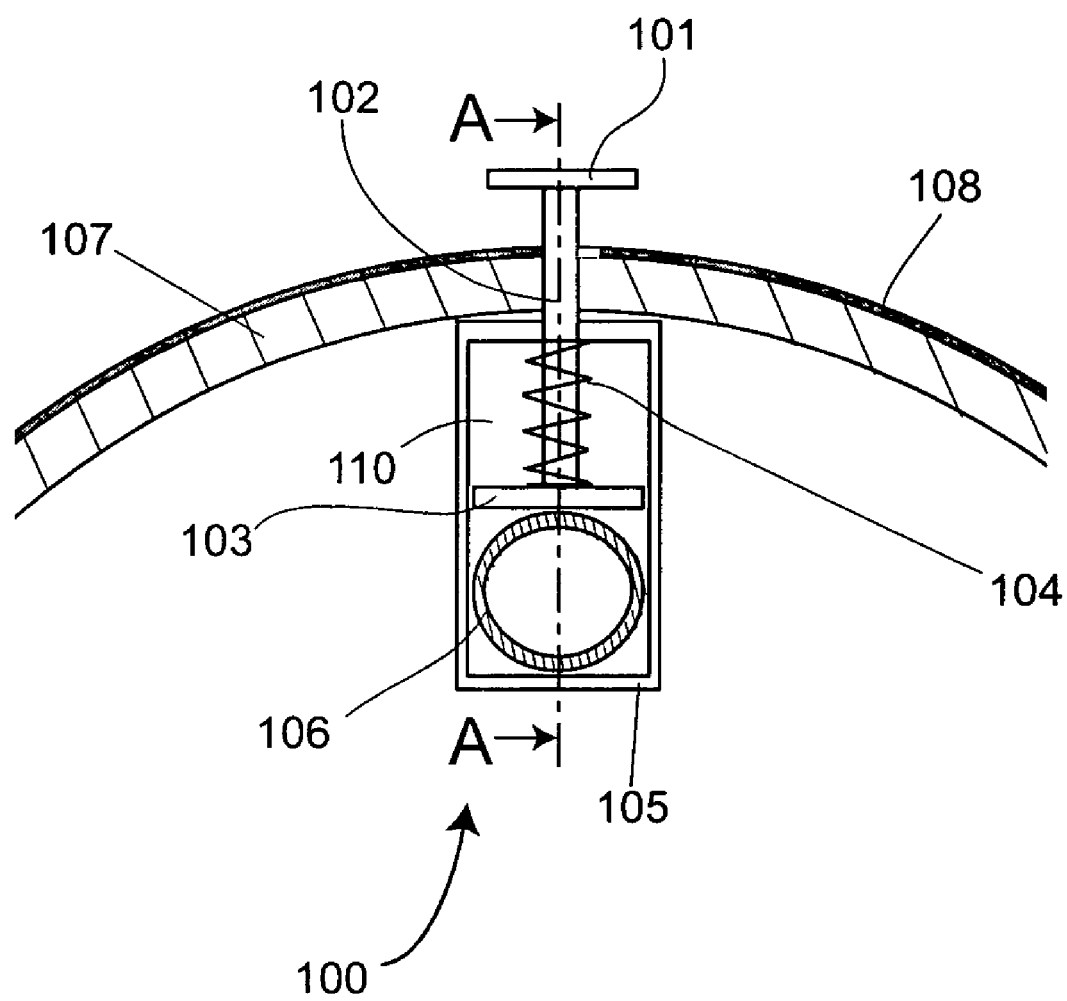
FIG. 3 shows a cross-sectional representation of an embodiment of the clamping device shown in the release ("open") position.

FIG. 3 shows the clamping device 100 in an open state. When in the open state, a plate 108 can be placed in the gap on the outer, peripheral, i.e., outer surface of cylinder 107 with the end edges of the flexible plate 108 placed in the gap formed between the clamping element 101 and the outer surface of the cylinder 107.

After a plate is placed in the gap, the air pressure is removed from air hose 106, e.g., by using switch 116 to stop the pump 112 providing air pressure to the interior of the inflatable hose 106. The bias of the at least one spring 104 is such that the spring(s) 104 cause the lifting bar to move away from the surface of the cylinder, and thus the guide shaft 102 to cause the clamping element to press against the outer, peripheral surface of cylinder 107, and thus clamp the end of the plate 108 to the cylinder. This is called the closed state of the clamping device 100, and is as shown in FIGS. 1A and 2.

Thus, the edges of the flexible plate 108 are clamped with the force of the at least one spring 104.

The unclamping and removal of the flexible plate 108 takes place in reverse order to the clamping. That is, starting from the closed state shown in FIG. 2, the operator causes the source 112 of air pressure to provide air pressure to the interior of the inflatable air hose 106 to inflate the hose 106 in order to cause the cross section of the hose to expand. The air hose's expanding imparts a force onto the lifting bar 103 that causes the at least one spring 104 to compress, and also to move the guide shaft and hence the clamping bar such that a gap is created between the clamping bar 101 and the outer surface of the cylinder 107. Such a gap provides for removing the edge of a flexible plate between the clamping element 101 and the outer surface of the cylinder 107.

Figure 4:
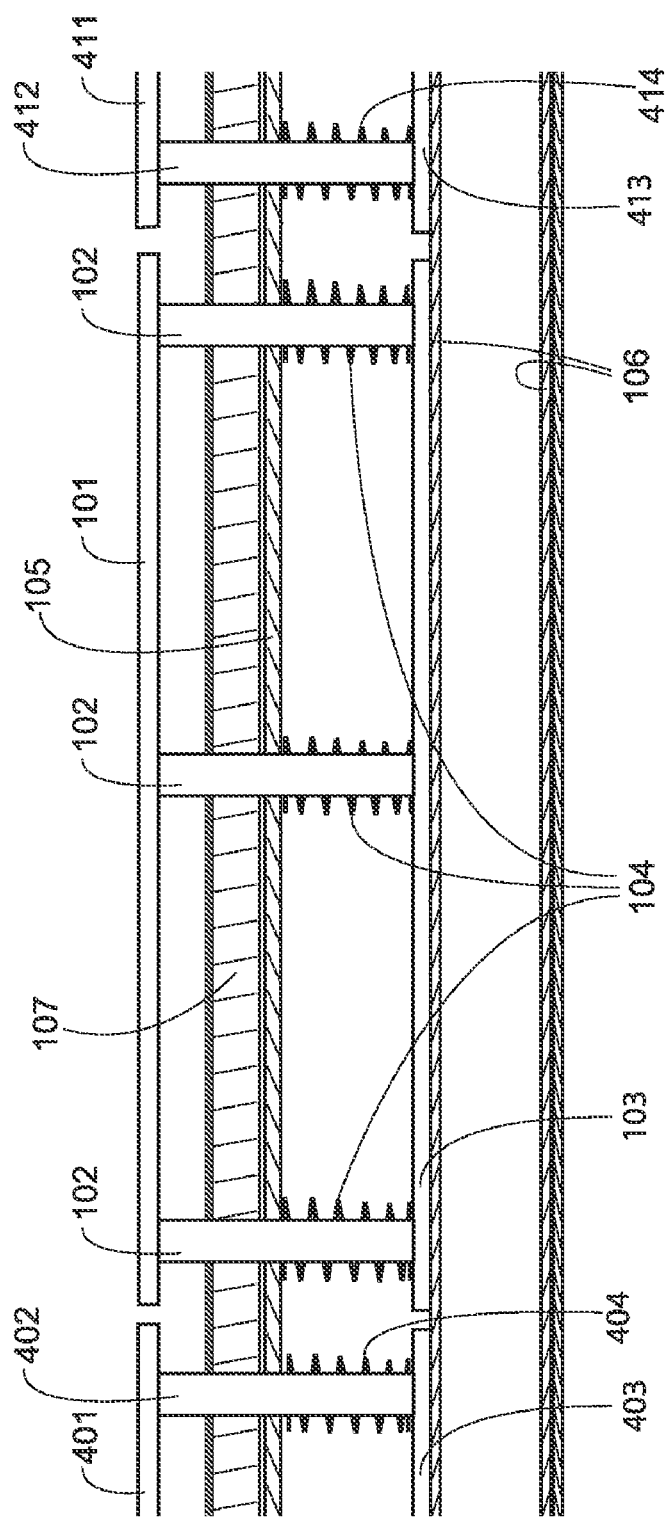
FIG. 4 shows the section shown in FIG. 3 and marked A—A, with the clamping device in the release position, and for an embodiment that includes several sections of a clamping device that provides for clamping a plurality of plate segments onto the surface of the cylinder.

One embodiment includes a plurality of clamping elements such as 101 oriented along the axial direction such that the clamping of more than one flexible plates in the axial direction is possible. FIG. 4 shows the section A—A shown in FIG. 3, with the clamping device 100 in the open position. In addition to the clamping element 101, part of two adjacent clamping elements 401 and 411 are shown. Each clamping element is attached to its own set of guiding shafts, three shafts 102 shown for clamping element 101, and one guiding shaft 402, 412 of the respective sets of shafts attached to the clamping elements 401 and 411 are shown. The other ends of the guiding shafts are attached to respective lifting bars. Lifting bar 103 is coupled to shafts 102 and clamping element 101, while parts of lifting bars 403 and 413 are coupled via shafts 402 and 412, respectively, to the clamping elements 401 and 402, respectively. A first set of springs 104 is shown around shafts 102, a second set 404 around shafts 402, and a third set 414 around shafts 412.

By so arranging each clamping element to have its own guiding shafts, lifting bars, and springs, the different clamping elements can clamp plates of different thicknesses.

Note that in the embodiment shown, only one inflatable hose 106 is used for the whole axial length, i.e., for all the clamping elements. In an alternate embodiment, independent hoses are used such that individual clamping elements may be individually controlled by switchably supplying air pressure to respective hoses.

Thus, an alternate embodiment includes a plurality of instances of the clamping device, such clamping devices distributed along the in axial direction of the cylinder, each clamping device adapted to clamp a plate independently of the clamping by the other clamping device(s).

In one embodiment, the cylinder has a circumference of approximately 129 cm and an axial length of 210 cm. Such a cylinder, can accommodate, for example, plates of 50 in by 80 in. In one embodiment, 20 clamping devices are distributed in the axial direction.

Figure 5:
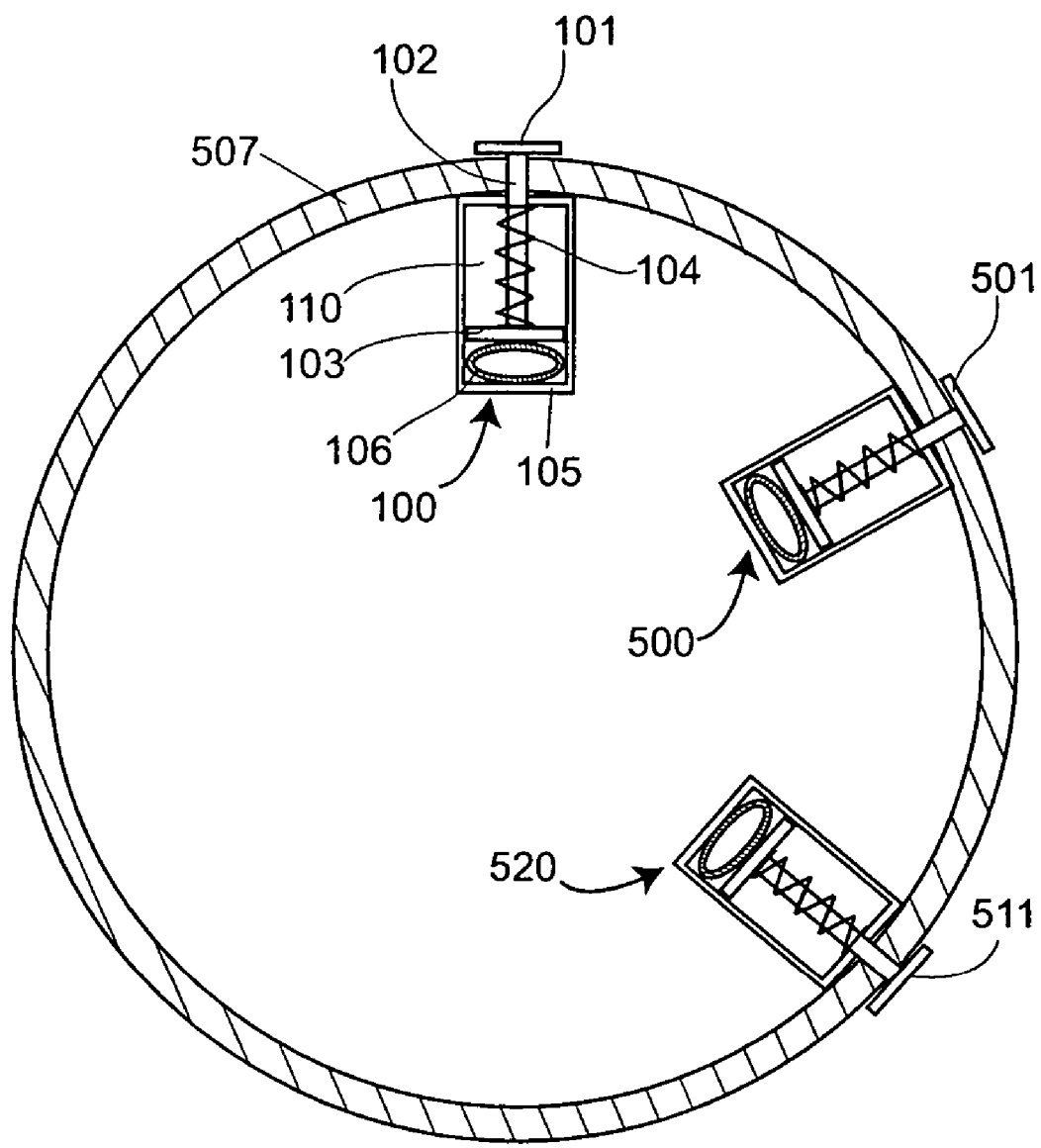
FIG. 5 shows in cross section an embodiment of a imaging cylinder with three instances of the clamping device distributed in the circumferential direction.

Another aspect of the invention is that a plurality of clamping devices are provided in the circumferential direction. FIG. 5 shows a cylinder 507 with three instances of the clamping device: the clamping device 100, and additional clamping devices 500 and 520 that respectively include clamping elements 501 and 511. All three clamping devices are shown in the closed (clamping) position. No plate is shown on the cylinder 507. Having a plurality of clamping devices in the circumferential direction provides for a plurality of plate segments that are shorter in the circumferential direction to be loaded.

One embodiment includes clamping elements distributed at two locations in the circumferential direction. In an alternate embodiment, three locations are used in the circumferential direction. The design decision as to how many locations depends on the number of "standard" plate formats available.

While apparatus embodiments are described above, another aspect of the invention is a method of loading a plate onto a imaging cylinder by using the apparatus as described herein.

Note that while in one embodiment, the inflatable air hose 106 is inflated with air, in alternate embodiments, another gas is used, and in yet another embodiment, a liquid is used.

Figure 6:
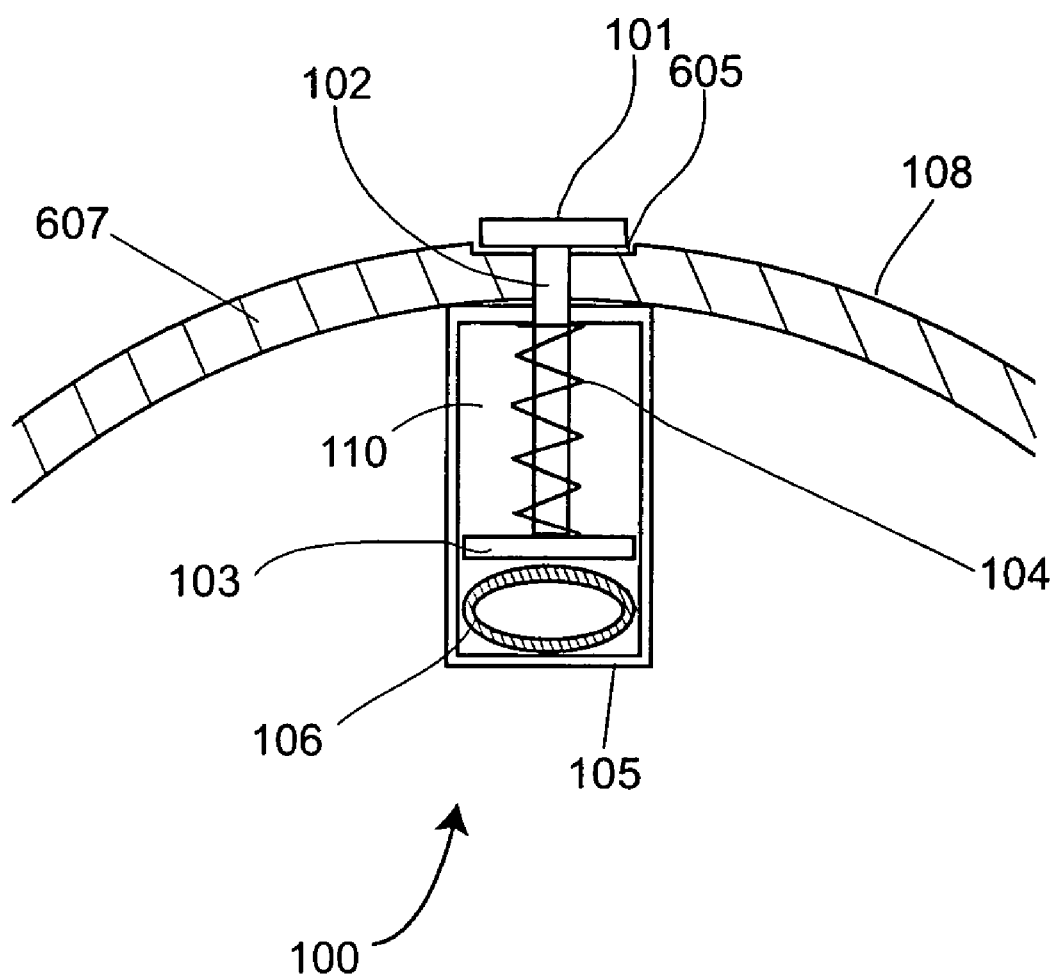
FIG. 6 shows one example of a clamping device on a cylinder, wherein the cylinder includes an indentation to accommodate the clamping element 101 of the clamping device 100.

Note that while the gap is shown being formed between the clamping element 101 and the outer surface of the cylinder 107, the term outer surface in this context includes the case that the outer surface is somewhat indented in the area of the clamping element. FIG. 6 shows one such example wherein a cylinder 607 includes an indentation 605 to accommodate the clamping element 101 of the clamping device 100.

It should be appreciated that although the invention has been described in the context of flexography, the invention is not limited to such contexts and may be utilized in various other applications and systems for mounting one or more plates or plate segments onto a imaging cylinder.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

All publications, patents, and patent applications cited herein are hereby incorporated by reference.

In the claims below and the description herein, any one of the terms comprising, comprised of or which comprises is a an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

Similarly, it is to be noticed that the term coupled, when used in the claims, should not be interpreted as being limitative to direct connections only. Thus, the scope of the expression a device A coupled to a device B should not be limited to devices or systems wherein an output of device A is directly connected to an input of device B. It means that there exists a path between an output of A and an input of B which may be a path including other devices or means.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

We claim:
1. An apparatus comprising:
an imaging cylinder of an imaging device, the cylinder having an outer surface and an inner wall; and
a clamping device arranged for clamping an edge of a flexible plate onto the outer surface of the cylinder,
wherein the clamping device includes:
a base body having a hollow interior, and extending in the axial direction of said cylinder, the base body being fixed to the inner wall of the cylinder or incorporated into the inner wall of the cylinder;
a clamping element having a width and extending in the axial direction of the cylinder, located adjacent to the outer surface of the cylinder wherein the base body is located;
a lifting bar located in the interior of the base body and coupled to the clamping element by at least one guiding shaft, the lifting bar being movable in a first radial direction to move the clamping element away from the outer surface of the cylinder to form a gap between the outer surface and the clamping element, the lifting bar further being movable in the radial direction opposite the first radial direction to close the gap formed between the outer surface of the cylinder and the clamping element; and
a mechanism to impart and maintain compressive force between the clamping element and the outer surface of the cylinder such that any gap formed is maintained closed unless forcibly opened,
the apparatus further comprising:
an inflatable hose arranged in the interior of the base body and adapted to move the clamping element in the first radial direction when pressure is applied to inflate the inflatable hose,
wherein the width of the clamping element is configured such that the gap formed between the clamping element and the outer surface is sufficient to grip the edge of the flexible plate when the gap is closed, and
wherein a forward gap and a rear gap are formed by the clamping bar so that two edges of the same or different flexible plates may be clamped by the clamping device,
such that when the gaps are formed by inflating the inflatable hose to move the lifting bar in the first radial direction, the edge of the flexible plate can be placed in either gap, and such that when the gaps are closed by the inflatable hose deflating, the plate is maintained clamped onto the outer surface of the cylinder.

2. An apparatus as recited in claim 1, wherein the mechanism to impart and maintain compressive force includes at least one spring. between the lifting bar and the inner wall of the cylinder such that the spring is biased to impart and maintain the compressive force in the radial direction, and such that when the inflatable hose is inflated, a force opposite to the compressive force is applied on said lifting bar to move the clamping element in the first radial direction away from the other surface to the cylinder.

3. An apparatus as recited in claim 2, wherein the inflatable hose is coupled to a switchable supply of air pressure, such that switching the air pressure on or off opens or closes the gap.

4. An apparatus as recited in claim 3, wherein the switchable supply of air pressure is coupled to a control system to automatically open or close the gap according to a sequence of loading or unloading.

5. An apparatus as recited in claim 3, wherein the switchable supply of air pressure is includes a pump and a switch to switch the pump on or off.

6. An apparatus as recited in claim 3, wherein the switchable supply of air pressure includes a valve element to switch the supply of air pressure on or off.

7. An apparatus as recited in claim 1, wherein the clamping device includes at least one further clamping element in the axial direction, such that a plurality of plates of different thickness are able to be placed distributed in the axial direction of the cylinder and clamped onto the outer surface of the cylinder.

8. An apparatus as recited in claim 1, further comprising at least one other instance of the clamping device, such clamping devices distributed along the axial direction of the cylinder, each clamping device adapted to clamp a plate independently of the clamping by the other clamping devices.

9. An apparatus as recited in claim 8 further including a plurality of said clamping devices distributed along the circumferential direction of said cylinder to clamp a plurality of plates of different formats and thickness on the peripheral surface of said cylinder.

10. An apparatus as recited in claim 1, further comprising at least one other instance of the clamping device, such other instances of the clamping devices distributed along the circumferential direction of the cylinder, such that a plurality of plates of different formats may be clamped onto the outer surface of the cylinder.

11. A clamping device arranged to clamp an edge of a flexible plate onto the outer surface of an imaging cylinder of an imaging device, the cylinder having the outer surface and an inner wall, the clamping device comprising:
a base body having a hollow interior, and extending in the axial direction of said cylinder, the base body being fixed to the inner wall of the cylinder or incorporated into the inner wall of the cylinder;
a clamping element having a width and extending in the axial direction of the cylinder, located adjacent to the outer surface of the cylinder wherein the base body is located;
a lifting bar located in the interior of the base body and coupled to the clamping element by at least one guiding shaft, the lifting bar being movable in a first radial direction to move the clamping element away from the outer surface of the cylinder to form a gap between the outer surface and the clamping element, the lifting bar further being movable in the opposite radial direction to close the gap formed between the outer surface of the cylinder and the clamping element;
an inflatable hose arranged in the interior of the base body and adapted to move the clamping element in the first radial direction when pressure is applied to inflate the inflatable hose; and
a mechanism to impart force on the clamping element such that any gap formed is maintained closed unless forcibly opened by inflating the inflatable hose,
wherein the width of the clamping element is configured such that the gap formed between the clamping element and the outer surface is sufficient to grip the edge of the flexible plate when the gap is closed,
such that when the gap is formed by inflating the inflatable hose to move the lifting bar in the first radial direction, the edge of the flexible plate can be placed in the gap, and such that when the gap is closed by the inflatable hose deflating, the plate is clamped onto the outer surface of the cylinder.

12. A method comprising:
moving a clamping element having a width and extending in the axial direction of an imaging cylinder of an imaging device, the cylinder having an outer surface and an inner wall, the clamping element located adjacent to the outer surface of the cylinder, the moving being in a first radial direction away from the outer surface of the cylinder to form a gap between the outer surface and the clamping element, the clamping element having a width configured such that the gap formed between the clamping element and the outer surface is sufficient to grip an edge of a flexible plate when the gap is closed, placing the edge of the flexible plate in the gap between the outer surface of the cylinder and the clamping element;

moving the clamping element in a radial direction opposite to the first radial direction to close the gap; and maintaining a compressive force onto the edge placed between the outer surface and the clamping element to hold the flexible plate in a clamped state, wherein the moving of the clamping element is by moving a lifting bar located in the interior of a base body having a hollow interior and extending in the axial direction of said cylinder, the base body being fixed to the inner wall of the cylinder or incorporated into the inner wall of the cylinder, the lifting bar being coupled to the clamping element by at least one guiding shaft, and wherein the moving of the clamping element in the first radial direction and in the opposite direction is by respectively applying and removing pressure in an inflatable hose located in the interior of the base body and configured such that when the hose is inflated by applying pressure, the clamping element moves in the first radial direction away from the outer surface of the cylinder, and when the hose is deflated by removing the pressure, the clamping element moves in the radial direction opposite to the first radial direction, and the compressive force is applied.

13. A method as recited in claim 12, wherein the maintaining of the compressive force is by a set of at least one spring between the inner wall of the cylinder and the lifting bar, the set of at least one spring being biased to impart the compressive force to close the gap between the clamping element and the outer surface of the cylinder.

14. A clamping means comprising:

means for moving a clamping element having a width and extending in the axial direction of an imaging cylinder of an imaging device, the cylinder having an outer surface and an inner wall, the clamping element located adjacent to the outer surface of the cylinder, the means for moving configured to move the clamping element in a first radial direction away from the outer surface of the cylinder to form a gap between the outer surface and the clamping element, such that an edge of a flexible plate may be placed in the gap between the outer surface of the cylinder and the clamping element;

means for moving the clamping element in a radial direction opposite to the first radial direction to close the gap; and means for maintaining a compressive force onto any edge of the flexible plate placed between the outer surface and the clamping element to hold the flexible plate in a clamped state, wherein the means for moving of the clamping element includes means for moving a lifting bar extending in the axial direction of said cylinder and coupled to the clamping element, wherein the means for moving of the clamping element in the first radial direction and in the opposite directions is by respectively applying and removing pressure in an inflatable hose located and configured such that when the hose is inflated by applying pressure, the clamping element moves in the first radial direction away from the outer surface of the cylinder, and when the hose is deflated by removing the pressure, the clamping element moves in the radial direction opposite to the first radial direction, and the compressive force is applied, and wherein the width of the clamping element is configured such that the gap formed between the clamping element and the outer surface is sufficient to grip the edge of flexible plate when the gap is closed.

15. A clamping means as recited in claim 14, wherein the means for maintaining the compressive force uses a set of at least one spring between the inner wall of the cylinder and the lifting bar, the set of at least one spring being biased to impart the compressive force to close the gap between the clamping element and the outer surface of the cylinder.

* * * * *

UNITED STATES PATENT AND TRADEMARK OFFICE
CERTIFICATE OF CORRECTION

| | | |
|---|---|---|
| PATENT NO. | : 7,165,492 B2 | |
| APPLICATION NO. | : 11/331424 | |
| DATED | : January 23, 2007 | |
| INVENTOR(S) | : Koberg et al. | |

It is certified that error appears in the above-identified patent and that said Letters Patent is hereby corrected as shown below:

In column 9, line 56, kindly change "from the other surface to the cylinder." to --from the outer surface of the cylinder.--

Signed and Sealed this

Twentieth Day of March, 2007

JON W. DUDAS
*Director of the United States Patent and Trademark Office*